Patented Jan. 25, 1927.

1,615,226

UNITED STATES PATENT OFFICE.

VINCENT A. LAPENTA AND SIMON REISLER, OF INDIANAPOLIS, INDIANA.

MEDICAL PREPARATION OF COLLOIDAL BISMUTH.

No Drawing. Application filed February 15, 1926. Serial No. 88,445.

Our invention relates to a medicinal preparation of bismuth products in the colloidal state, being especially prepared to possess specific physical and chemical properties; and consists substantially in the processes, combination, proportion and handling of elements hereinafter set forth and pointed out more particularly in the claims.

An object of our invention is to produce a reaction product which serves to stabilize the colloidal dispersion of bismuth particles.

It is an object of our invention to especially prepare a bismuth product in the colloidal state, as a therapeutic agent possessing specific physical and chemical properties hereinafter described.

A further object of our invention is to provide a process of reduction which utilizes the combined action of formaldehyde and glucose in an alkaline medium following the action of formaldehyde on glucose on Bi in acid solution, producing thereby a reaction product, that stabilizes the colloidal dispersion of bismuth particles.

It is a primary object of our invention to provide a self stabilized product of this class, which fulfills in a special manner the requirements for the bismuth, therapy, by injection, being a product easily absorbed and without injury to muscular tissue and not containing any fatty, and oily media such as oils or soaps.

It is also an object of our invention to produce a bismuth product, stabilized and protected from deterioration by a polymerized-glucose-colloid, maintaining absolutely balanced and complete colloidial properties in high concentration and showing on ultra-microsopic examination uniformity of structure and very active Brownian movements.

Our product is a new and useful medicinal agent, which upon experimental practice on laboratory animals, and in extended clinical practice has been shown to possess remarkable efficiency in the treatment of the disease of syphilis.

This product results from the reduction of finely hydrolized Bi chloride in alkaline solution and thru the interaction of glucose and formaldehyde. We have found that the interaction of these two reducing agents produced a finely divided Bi colloid particle of submicron size, which has the micel film formed by derivatives of the interaction of formaldehyde and glucose which provides for the proper adsorption of ions producing the necessary electrical equilibrium making dispersion possible of these particles in a colloidal dispersoid system showing active and vibratory Brownian movement. This product, when injected intramuscularly, is easily absorbed without injury to the muscular tissue. Example is here given of the process conveniently used to obtain this product:

10 grams Bi hydroxide are dissolved in 18 c. c. of warm HCL. This solution is treated with 10 grams of glucose dissolved in as little $H_2O$ as possible; the resulting solution is then warmed slightly and allowed to cool. 5 c. c. of U. S. P. formaldehyde are then added and allowed to stand for several minutes. 300 c. c. $H_2O$ which has been rendered $CO_2$ free thru prolonged boiling are then added at 85° C. temperature with constant stirring. Then add with constant stirring 25% NaOH solution until solution is alkaline. The addition of NaOH is continued drop by drop maintaining a temperature of 85° C. until signs of reduction appear, by solution becoming slightly grayish and black in appearance. The addition of NaOH is then continued more cautiously until reduction is complete.

The product is then allowed to stand for 12 hours in an airtight closet where dishes of soda-lime are kept to absorb $CO_2$ from the air. Supernatant liquid is cautiously removed and $CO_2$ free $H_2O$ is added equal to half of the original volume. The supernatant fluid first removed is then dialyzed against running $H_2O$ until no more ions of chlorine Bi or OH are present. The product is then tested for total solid content and stored in hermetically sealed containers for future use as hereinafter described.

The precipitate hereinbefore mentioned is also dialyzed in a separate container against distilled water until no more chlorine Bi or HO ions are detected in the dialyzing water. It is then also stored in hermetically sealed containers.

The final product is prepared by dispersing the dialyzed precipitate in sufficient $CO_2$ free $H_2O$ to obtain sol of desired percentage and enough glucose polymer hereinbefore described is added to stabilize sol. This amount is determined by the amount of this protective glucose polymer necessary to prevent precipitation of 10 c. c. of the Bi sol hereinbefore mentioned from the precipitating action of 1 c. c. of 5% NaCl solution. That amount of glucose polymer preventing said precipitation action for a time 25 times longer than the precipitating time of said salt solution on unprotected sol shall be termed "the protective unit amount per c. c. of sol."

In this state the product keeps indefinitely and can be diluted to any desired strength. Bi element content is ascertained by analysis, for amount forming basis for dilutions. The permanent diluted dispersoid pseudo-solutions are produced by diluting to the desired Bi content with $CO_2$ free $H_2O$ containing 0.1% of dialyzed polymerized glucose colloid.

While we have illustrated in a general way, certain steps which may be employed in carrying our invention into effect, it is evident that many modifications may be made in the various details without departing from the scope of the appended claims, it being understood that our invention is not restricted to exact method of procedure, herein described.

We claim as our invention:

1. A process of reduction which utilizes the combined action of formaldehyde and glucose in an alkaline medium and the interaction on glucose of alkali and formalin producing a reaction product that stabilizes the colloidal dispersion of bismuth particles.

2. A final product composed of a dispersion of highly divided colloidal bismuth in $CO_2$ free distilled water, stabilized and protected by polymerized glucose colloid, both agents being the result of the specific conditions of our described process.

3. A special colloidal bismuth product, stabilized and protected by a polymerized glucose colloid, maintaining absolutely balanced and complete collodial properties in high concentration and showing an ultramicroscopic examination uniformity of structure and very active Brownian movements.

In testimony whereof, we have hereunto set our hands on this the 9th day of February, 1926, A. D.

VINCENT A. LAPENTA, M. D.
SIMON REISLER, M. D.